(12) United States Patent
Verna (10) Patent No.: US 12,441,479 B2
(45) Date of Patent: *Oct. 14, 2025

(54) ELECTRIC VERTICAL TAKEOFF AND LANDING (EVTOL) AIRCRAFT LIFT MOTOR WITH AIR COOLING

(71) Applicant: BETA AIR LLC, South Burlington, VT (US)

(72) Inventor: Raffaello Verna, Creedmoor, NC (US)

(73) Assignee: BETA AIR LLC, South Burlington, VT (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/197,394

(22) Filed: May 15, 2023

(65) Prior Publication Data

US 2023/0303262 A1 Sep. 28, 2023

Related U.S. Application Data

(63) Continuation of application No. 17/563,498, filed on Dec. 28, 2021, now Pat. No. 11,691,750.

(51) Int. Cl.
| | | |
|---|---|---|
| *B64D 33/08* | (2006.01) | |
| *B64C 29/00* | (2006.01) | |
| *B64D 27/31* | (2024.01) | |
| *B64D 27/34* | (2024.01) | |
| *B64C 11/48* | (2006.01) | |

(52) U.S. Cl.
CPC .......... *B64D 33/08* (2013.01); *B64C 29/0025* (2013.01); *B64D 27/31* (2024.01); *B64D 27/34* (2024.01); *B64C 11/48* (2013.01)

(58) Field of Classification Search
CPC .......... B64D 27/24; B64D 33/08; B64C 11/48; B64C 29/0025
USPC .......................................................... 244/6
See application file for complete search history.

(56) References Cited

U.S. PATENT DOCUMENTS

| | | | | |
|---|---|---|---|---|
| 8,026,644 | B2 * | 9/2011 | Violett | A63H 27/02 |
| | | | | 310/58 |
| 9,645,580 | B2 * | 5/2017 | Pedersen | B60V 1/10 |
| 9,673,673 | B2 * | 6/2017 | Sheppard | H02K 9/02 |
| 9,819,241 | B2 * | 11/2017 | Smith | H02K 7/145 |
| 10,399,694 | B2 * | 9/2019 | Huang | B64D 41/007 |
| 10,554,091 | B2 * | 2/2020 | Cocks | H02K 5/18 |
| 10,819,187 | B2 * | 10/2020 | Bei | F04D 25/082 |

(Continued)

*Primary Examiner* — Brady W Frazier
(74) *Attorney, Agent, or Firm* — Brake Hughes Bellermann LLP (57) ABSTRACT

An electric vertical takeoff and landing (eVTOL) aircraft lift motor is disclosed. The eVTOL aircraft lift motor includes a stator connected to the eVTOL motor and a rotor coaxial within the stator. The stator includes an inner cylindrical surface and an outer cylindrical surface coaxial about an axis. The rotor includes a rotor cylindrical surface defining the axis, an air gap formed by combining the rotor cylindrical surface with the inner cylindrical surface of the stator, a magnet array positioned opposite to and spaced from the inner cylindrical surface by the air gap. The eVTOL aircraft lift motor also includes a first fan connected to and configured to rotate with the rotor. In addition, in some embodiments, the first fan is connected to an axial end of the rotor. The first fan may include a base platform, a roof platform, and a blade configured to direct air toward the air gap.

20 Claims, 4 Drawing Sheets

(56) References Cited

U.S. PATENT DOCUMENTS

| | | | |
|---|---|---|---|
| 2006/0022529 A1* | 2/2006 | De Filippis | F04D 29/329 |
| | | | 310/58 |
| 2007/0222311 A1* | 9/2007 | Vasilescu | F04D 29/444 |
| | | | 310/58 |
| 2007/0273221 A1* | 11/2007 | Kinoshita | H02K 3/50 |
| | | | 310/58 |
| 2010/0156206 A1* | 6/2010 | Nishitani | H02K 11/05 |
| | | | 310/71 |
| 2010/0320878 A1* | 12/2010 | Izumi | H02K 9/06 |
| | | | 310/60 R |
| 2013/0174533 A1* | 7/2013 | Ribarov | B64C 11/48 |
| | | | 415/60 |
| 2019/0229590 A1* | 7/2019 | Wacknov | B64D 31/06 |
| 2019/0315476 A1* | 10/2019 | Lawrence | H02K 7/14 |
| 2020/0144894 A1* | 5/2020 | Teofili | H02K 5/207 |
| 2020/0177056 A1* | 6/2020 | Nakamura | H02K 5/203 |
| 2020/0307778 A1* | 10/2020 | Takemoto | B64U 50/23 |
| 2021/0036580 A1* | 2/2021 | Cottrell | H02K 1/20 |
| 2021/0104935 A1* | 4/2021 | Morrison | B64D 37/30 |
| 2021/0317835 A1* | 10/2021 | Sawata | F04D 25/082 |

* cited by examiner

ELECTRIC VERTICAL TAKEOFF AND LANDING (EVTOL) AIRCRAFT LIFT MOTOR WITH AIR COOLING

CROSS-REFERENCE TO RELATED APPLICATIONS

This application is a continuation of and claims the benefit of priority of U.S. Non-Provisional application Ser. No. 17/563,498 filed on Dec. 28, 2021, and entitled "ELECTRIC AIRCRAFT LIFT MOTOR WITH AIR COOLING," which is incorporated by reference herein in its entirety.

FIELD OF THE INVENTION

The present invention generally relates to the field of motors for electric aircraft. In particular, the present invention is directed to an electric aircraft lift motor with air cooling.

BACKGROUND

Development in electric aircraft provides new opportunities for various forms of flight. Electric motors, however, may overheat during use.

SUMMARY OF THE DISCLOSURE

In an aspect of the present disclosure is an electric vertical takeoff and landing (eVTOL) aircraft lift motor. The eVTOL motor includes a stator connected to the eVTOL motor and a rotor coaxial within the stator. The stator includes an inner cylindrical surface and an outer cylindrical surface coaxial about an axis. The rotor includes a rotor cylindrical surface defining the axis, an air gap formed by combining the rotor cylindrical surface with the inner cylindrical surface of the stator, and a magnet array positioned opposite to and spaced from the inner cylindrical surface by the air gap. In addition, the eVTOL motor includes a first fan connected to and configured to rotate with the rotor.

In another aspect of the present disclosure is a device for cooling a motor of an electric vertical takeoff and landing (eVTOL) aircraft. The device includes a stator connected to the eVTOL motor, the stator including an inner cylindrical surface and an outer cylindrical surface coaxial about an axis, and a rotor within the stator and configured to rotate around the axis, the rotor including a rotor shaft defined along the axis. In addition, the device includes a magnet array on the rotor, the magnet array positioned opposite to and spaced from the inner cylindrical surface by an air gap disposed between the rotor shaft or magnet array and the inner cylindrical surface of stator. Still further, the device includes a cooling fin on the outer cylindrical surface of the stator, and a fan connected to and configured to rotate with the rotor around the axis.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed an electric aircraft lift motor with air cooling. In an embodiment, aspects of the present disclosure is a lift motor implementing one or more fans on the motor to cool components of the motor. Embodiments may further include cooling fins on an outer surface of the stator. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", "inner", "outer", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
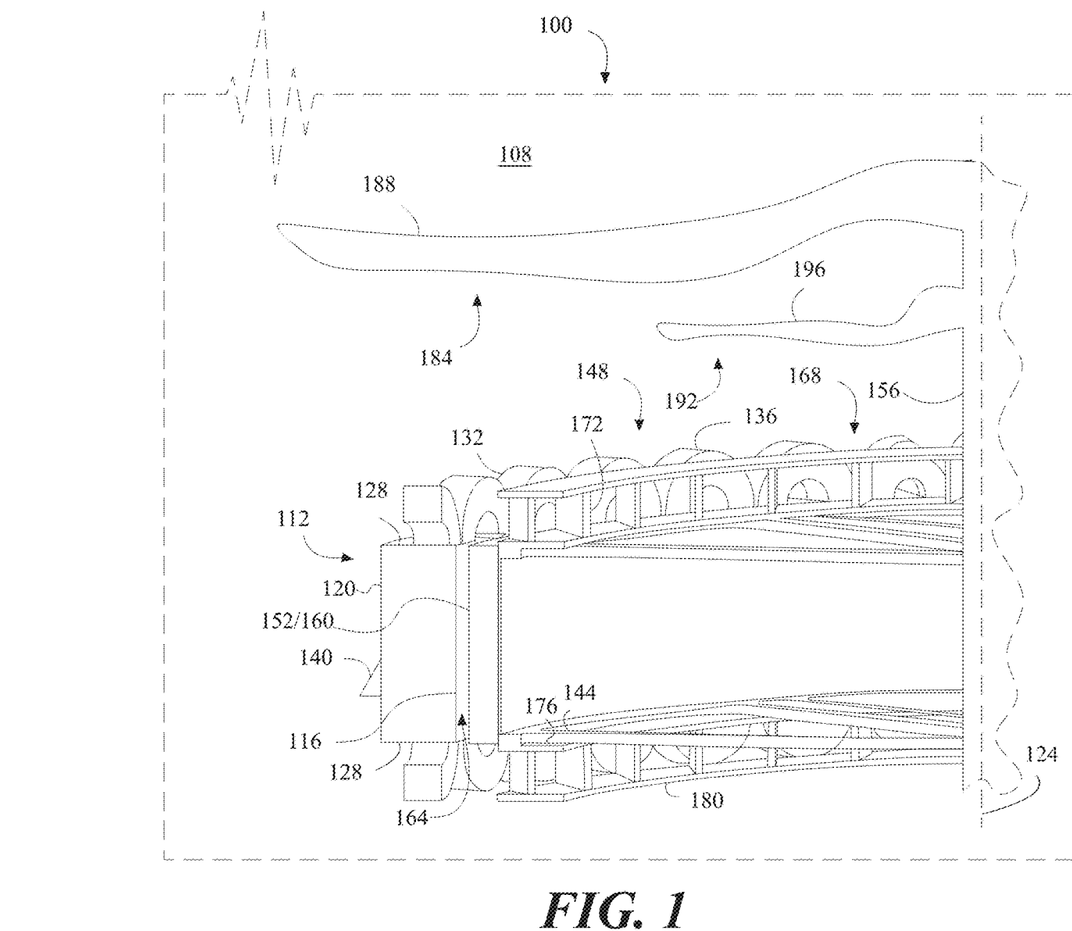
FIG. 1 is a sectional view of an exemplary embodiment of a system for cooling a motor of an electric aircraft according to the present disclosure.

Referring now to the drawings, FIG. 1 illustrates an electric aircraft lift motor 100 with air cooling. Motor 100 includes a stator 112 connected to electric aircraft 108. Stator 112 includes an inner cylindrical surface 116 and an outer cylindrical surface 120 each coaxial about an axis of rotation 124 and at least partially defined by an axial edge 128 on either side. Stator 112 may comprise stacked laminations, also known as punchings, with inner teeth. An outer surface of the stacked laminations may form outer cylindrical surface 120. Inner cylindrical surface 116 and outer cylindrical surface 120 may share a coincident and parallel centerline disposed at the center of each cylindrical surface. Inner cylindrical surface 116 and outer cylindrical surface 120 may include different radii and thus include different sizes. Stator 112 may include windings 132 made of electrically conductive coil wound around a magnetic core, which may include without limitation an iron core or other magnetic material. Specifically, windings 132 may be wound around the inner teeth of the stacked laminations. Coil may include any material that is conductive to electrical current and may include, as a non-limiting example, various metals such as copper, steel, or aluminum, carbon conducting materials, or any other suitable conductive material. Each of windings 132 may form an oval shape with an end turn 136 on either end of windings 132. End turn 136 may extend past at least an axial edge 128 of stator 112. Each end turn 136 may extend past the corresponding at least an axial edge 128 such that a portion of an interior space of each of windings 132 at least partially extends past both at least an axial edge 128. Stator 112 may include one or more magnets which may be assembled in rows along a structural casing component. Further, stator 112 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding.

With continued reference to FIG. 1, outer cylindrical surface 120 of stator 112 may include at least a cooling fin 140 as a heat exchanger to draw heat from stator 112. At least a cooling fin 140 may include a plurality of cooling fins, which may be evenly distributed radially on outer cylindrical surface 120. At least a cooling fin 140 may be made from any thermally conductive material known in the art including, without limitation, copper, nickel, aluminum, stainless steel, and/or any combination thereof. At least a cooling fin 140 may be attached to outer cylindrical surface 120 and may extend radially from the outer cylindrical surface 120. At least a cooling fin 140 may include a flat surface, a wavy surface, and/or ridges. Any shape may be suitable for at least a cooling fin 140. At least a cooling fin 140 may include a plurality of cooling fins.

Still referring to FIG. 1, motor 100 includes a rotor 148 coaxial within stator 112. A rotor 148 is a portion of an electric motor that rotates with respect to a stator 112 of the electric motor, such as stator 112. Rotor 148 includes a rotor cylindrical surface 152, wherein the rotor cylindrical surface 152 and inner cylindrical surface 116 of stator 112 combine to form an air gap 164 between the rotor cylindrical surface 152 and the inner cylindrical surface 116. Rotor cylindrical surface 152 may be disposed opposite and opposing to inner cylindrical surface 116 of stator 112. Rotor 148 may include a rotor shaft 156. Rotor shaft 156 may be disposed coaxially and coincidentally within stator 112. Rotor shaft 156 may be rotatable relative to stator 112, which remains stationary relative to electric aircraft 108. Rotor cylindrical surface 152 may be radially spaced from rotor shaft 156 such as, for example, in a squirrel cage rotor assembly. At least a spoke 144 may extend from rotor shaft 156 to one or both of axial edge 128 of rotor cylindrical surface 152. At least a spoke 144 may include a plurality of spokes on each of axial edge 128 of rotor cylindrical surface 152. Rotor 148 may include a plurality of permanent magnets, namely a magnet array 160, disposed radially about the axis of rotation 124 of rotor shaft 156 which may be parallel and coincident with axis of rotation 124 of motor 100. Magnet array 160 may be positioned on rotor cylindrical surface 152 and radially from rotor shaft 156, such that rotor cylindrical surface 152 is between magnet array 160 and rotor shaft 156. Magnet array 160 may be opposite inner cylindrical surface 116 of stator 112 and spaced from the inner cylindrical surface 116 by air gap 164. Rotor cylindrical surface 152 may comprise magnet array 160. Magnet array 160 may include a Halbach array. A Halbach array is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the rotor shaft 156, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable. Magnet array 160 may comprise a magnet sleeve forming at least part of rotor cylindrical surface 152 with slits and/or ribs in the magnet sleeve to further dissipate heat. Slits and/or ribs may be unidirectional. Slits and/or ribs may be bidirectional on magnet array 160 such as, for example, in a chevron pattern.

With continued reference to FIG. 1, a first fan 168 is connected to an axial end of rotor 148 and configured to rotate with rotor 148. As used in this disclosure, an "axial end" is an end along an axis of rotation of a body. First fan 168 may be a centrifugal fan. As used in this disclosure, a "centrifugal fan" is a mechanical device for moving air in a direction at an angle to the incoming air. For example, a centrifugal fan may direct air radially in a direction substantially perpendicular to the incoming air. First fan 168 includes at least a blade 172 configured to direct air toward air gap 164. In some embodiments, first fan 168 may be configured to direct air across air gap 164. Directed air could be caused to circulate through air gap 164 due to the Venturi effect. At least a blade 172 may be configured to direct air radially away from axis of rotation 124. At least a blade 172 may be one or more straight radial blades each comprising a flat surface extending radially such that the flat surface is perpendicular to axis of rotation 124. According to the direction of rotation, the at least a blade 172 may slope outward toward inner cylindrical surface 116 of stator 112. At least a blade 172 may include a plurality of blades similarly positioned and spaced from each other so each of plurality of blades is angled outward toward inner cylindrical surface 116 of stator 112 to direct air toward stator 112. At least a blade 172 may be backward-curved blades that curve against the direction of the rotation of first fan 168. At least a blade 172 may be forward-curved blades that curve in the direction of the rotation of first fan 168. At least a blade 172 may be on one or more axials ends of rotor 148. As used in this disclosure, "on" may include directly on and indirectly attached to such that there are one or more intervening elements. First fan 168 may include a base platform 176 and a roof platform 180 wherein at least a blade 172 is secured between base platform 176 and roof platform 180. At least a blade 172 may be confined by base platform 176 and roof platform 180. Each of axial end may include an axial edge. Base platform 176 and roof platform 180 may each be substantially parallel to one of axial edge 128 of stator 112. Thus, base platform 176 may be substantially parallel to roof platform 180. Base platform 176 may be attached to an axial edge of rotor 148. Base platform 176 and/or roof platform 180 may extend radially toward rotor shaft 156 and/or toward stator 112. Base platform 176 may rest on one or more of at least a spoke 144. At least a blade 172 may be substantially perpendicular to base platform 176 and roof platform 180. At least a blade 172 is configured to direct air toward air gap 164 between stator 112 and rotor 148. In some embodiments, at least a blade 172 may not be perpendicular to base platform 176 and roof platform 180. In some embodiments, at least a blade 172 may be configured to direct air toward an end turn 136 of windings 132. At least a blade 172 may be configured to direct air through at least part of interior space of windings 132. At least a blade 172 may include a blade on either axial end of rotor 148. For example, first fan 168 may include base platform 176, at least a blade 172, and roof platform 180 on both axial ends of rotor 148 such that one of base platform 176 is attached to one of the axial ends and another of base platform 176 is attached to the opposite axial end of rotor 148. At least a blade 172 on one axial end of rotor 148 may correspond to at least a blade 172 on the opposite axial end of rotor 148 such that each of at least a blade 172 is coplanar with another of at least a blade 172 on the opposite axial end.

Still referring to FIG. 1, an end of rotor shaft 156 may be attached to a propulsor 184. A "propulsor", as used herein, is a component or device used to propel a craft by exerting force on a fluid medium, which may include a gaseous medium such as air or a liquid medium such as water. Propulsor 184 may be any device or component that consumes electrical power on demand to propel an aircraft or other vehicle while on ground and/or in flight. Propulsor 184 may include one or more propulsive devices. In an embodiment, propulsor 184 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 184 may include at least a propulsor blade 188. At least a propulsor blade 188 may include a plurality of propulsor blades. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 184. In an embodiment, when a propulsor twists and pulls air behind it, it will, at the same time, push the aircraft forward with an equal amount of force. The more air pulled behind the aircraft, the more the aircraft is pushed forward. Thrust element may include a helicopter rotor incorporated into propulsor 184. A helicopter rotor, as used herein, may include one or more blade or wing elements driven in a rotary motion to drive fluid medium in a direction axial to the rotation of the blade or wing element. Its rotation is due to the interaction between the windings 132 and magnetic fields which produces a torque around the rotor's axis. A helicopter rotor may include a plurality of blade or wing elements.

Propulsor 184, including at least a propulsor blade 188, may be configured to prop wash along outer cylindrical surface 120 of stator 112. As used in this disclosure, "prop wash" is a disturbed mass of air pushed by and from a propulsor of an aircraft. Prop wash may be caused by sudden acceleration of propulsor. Prop wash may cause air turbulence in a helical pattern due to the rotation of the propulsor. At least a cooling fin 140, as discussed above, may be positioned on outer cylindrical surface 120 to receive prop wash. In some embodiments, at least a cooling fin 140 may be arranged to form one or more helical patterns on outer cylindrical surface 120.

Motor 100 may include a second fan 192 attached to rotor shaft 156. Second fan 192 may be positioned between propulsor 184 and rotor 148. Second fan 192 may have at least a secondary blade 196. At least a secondary blade 196 may include a plurality of blades. Second fan 192 may be a propeller fan with at least a secondary blade 196 extending substantially radially from a central hub at an angle to direct air flow. Second fan 192 may be configured to direct aid toward first fan 168 and/or along outer cylindrical surface 120 of stator 112. Second fan 192 may be configured to direct air toward at least a cooling fan on outer cylindrical surface 120. Second fan 192 may be attached to propulsor 184. In some embodiments, second fan 192 may be spaced form propulsor 184. Second fan 192 may have a radius that is smaller than a radius of propulsor 184. For example, a distance from an end of at least a secondary blade 196 to axis of rotation 124 may be less than a distance from an end of at least a propulsor blade 188 to axis of rotation 124. Second fan 192 may have a radius that is smaller, equal to, or larger than a radius of rotor cylindrical surface 152. Some or all of at least a secondary blade 196 may be aligned with some or all of at least a propulsor blade 188 such that an angular displacement between a plane containing axis of rotation 124 and some or all of the at least a secondary blade 196 is the same as the angular displacement between the plane and the corresponding some or all of the at least a propulsor blade 188. In some embodiments, some or all of at least a secondary blade 196 may not be aligned with some or all of at least a propulsor blade 188. At least a secondary blade 196 may extend perpendicular to axis of rotation 124. In some embodiments, at least a secondary blade 196 may extend toward rotor 148 such that the at least a secondary blade 196 and axis of rotation 124 form an acute angle relative to rotor 148. In other embodiments, at least a secondary blade 196 may extend away from rotor 148 such that the at least a secondary blade 196 and axis of rotation 124 form an obtuse angle relative to rotor 148.

Figure 2:
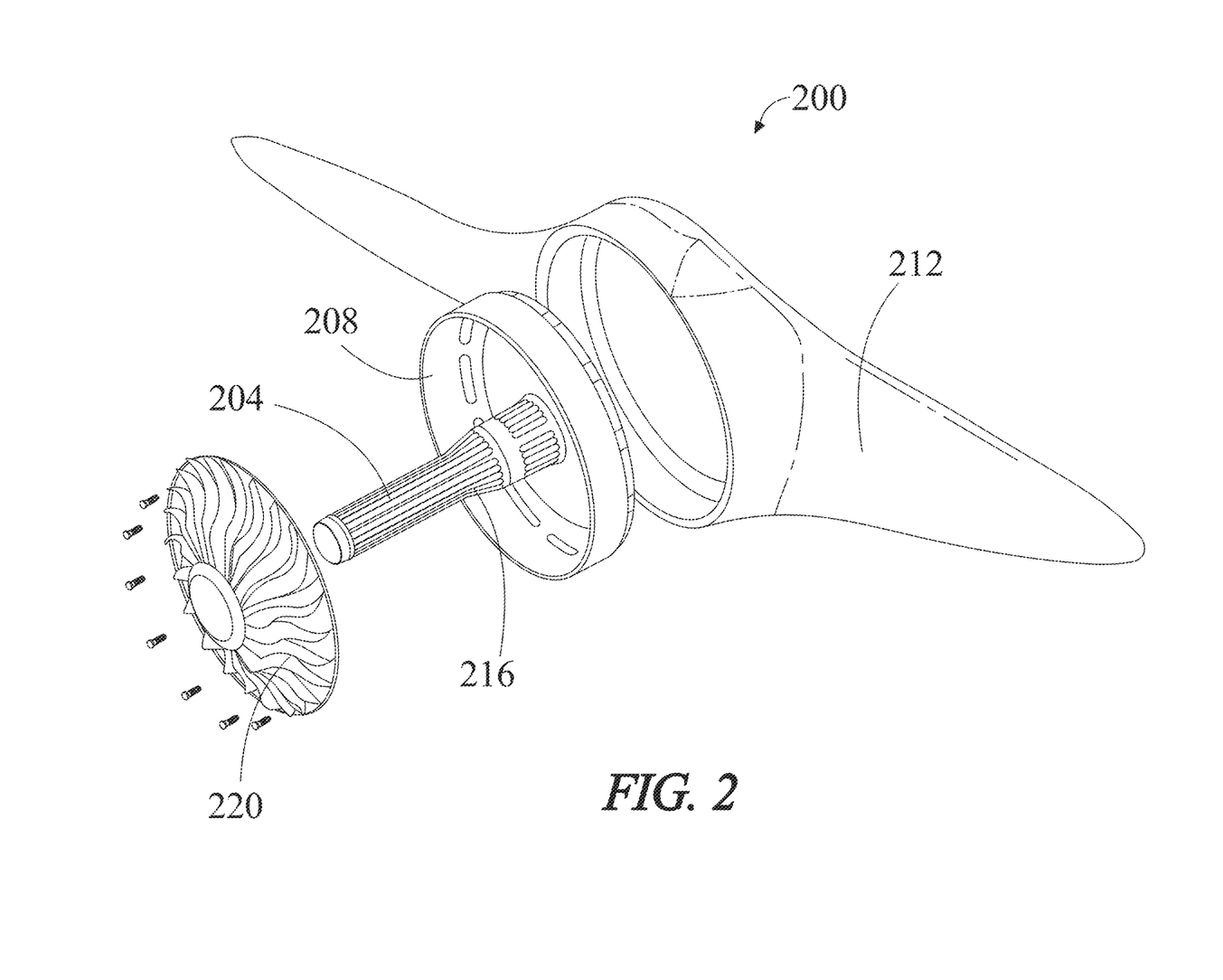
FIG. 2 is an embodiment of a rotor assembly used in an electric motor assembly.

Now referring to FIG. 2, an exemplary rotor assembly 200 is presented. Motor 100 may include aspects of a rotor assemble such as rotor assembly 200. Rotor assembly 200 may include rotor shaft 204. The rotor shaft 204 may be disposed coaxially and coincidentally within a stator assembly. Rotor shaft 204 may be rotatable relative to a stationary stator assembly. Rotor shaft 204 may be mechanically coupled to stator assembly within electric motor assembly hereinafter disclosed. Rotor shaft 204 may include cylindrical surface 216 disposed opposite and opposing to an inner cylindrical surface disposed on stator assembly. Rotor shaft 204 may include a plurality of permanent magnets, namely permanent magnet array 208, disposed radially about the axis of rotation of rotor shaft which is parallel and coincident with an axis of rotation of motor. Permanent magnet array 208 may be disposed radially about axis of rotation equally spaced, continuously spaced, or any arrangement in an array about rotor shaft 204. Permanent magnet array 208 may include a Halbach array.

Figure 3:
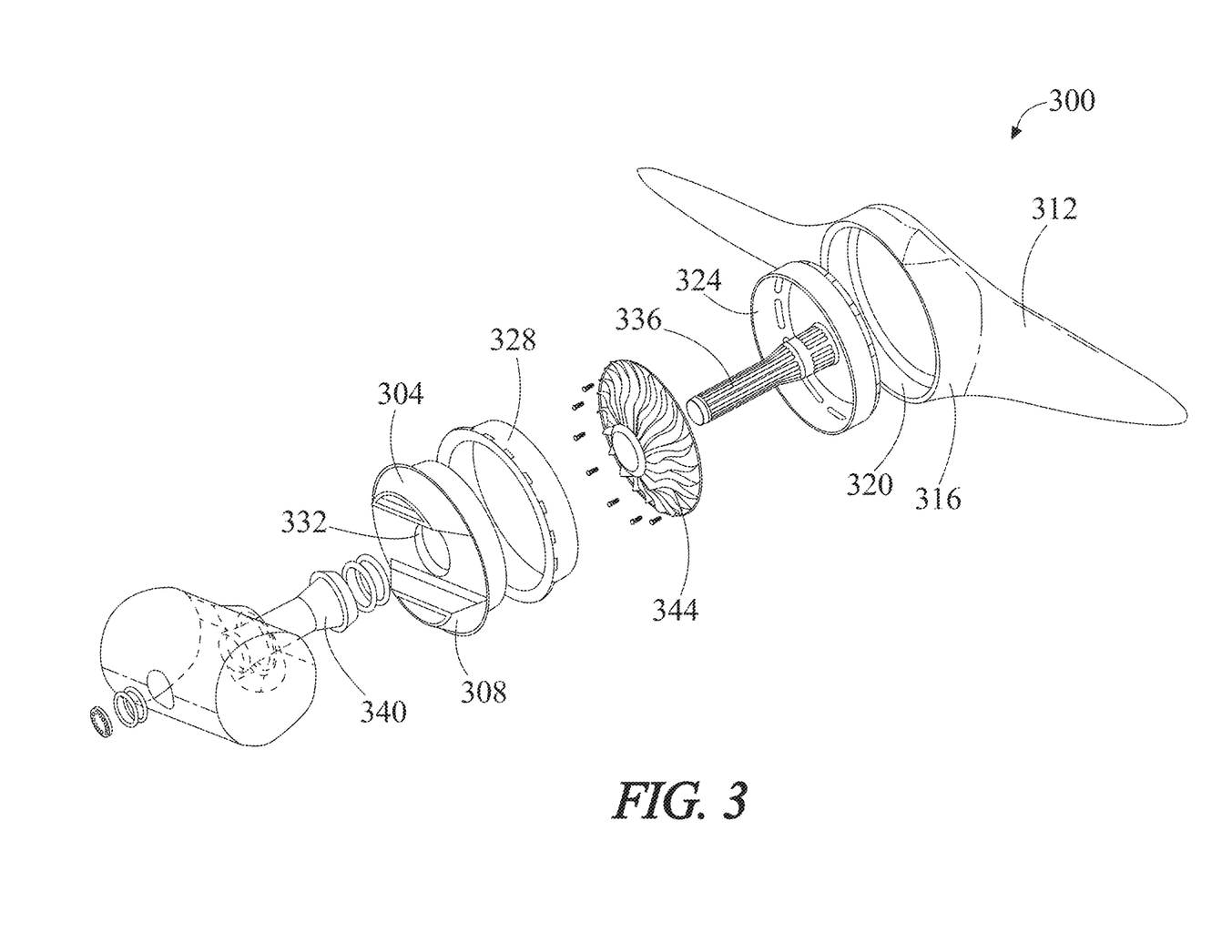
FIG. 3 is an illustration of an exploded view of an electric motor in a propulsion assembly.

With continued reference to FIG. 2, rotor shaft 204 may be coupled at a first end to propulsor 212. Propulsor 212 may be similar or the same as any of the propulsors disclosed herein. There may be at least an air gap disposed between a cylindrical surface of rotor shaft 204 or magnet array 208 and inner cylindrical surface of stator. Rotor shaft 204 may be mechanically coupled to impeller 220, which may be similar to or the same as any impeller disclosed herein. Motor 300, as shown in FIG. 3, may include impeller 220 coupled with the rotor shaft 204. Impeller 220, as described herein, is a rotor used to increase or decrease the pressure and flow of a fluid, including at least air. Impeller 220 may function to provide cooling to rotor assembly 200 and motor 300. Impeller 220 may include varying blade configurations, such as radial blades, non-radial blades, semi-circular blades and airfoil blades. Impeller 220 may further include single and/or double-sided configurations. Impeller 220 is described in further detail below. Additionally, or alternatively, in a non-limiting illustrative example, rotor shaft 204 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part.

Referring now to FIG. 3, an embodiment of motor 300 is illustrated. Motor 300 may include at least a stator 304. Stator 304, as used herein, is a stationary component of a motor and/or motor assembly. In an embodiment, stator 304 may include at least first magnetic element 308. As used herein, first magnetic element 308 is an element that generates a magnetic field. For example, first magnetic element 308 may include one or more magnets which may be assembled in rows along a structural casing component. Further, first magnetic element 308 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 308 may act to produce or generate a magnetic field to cause other magnetic elements to rotate, as described in further detail below. Stator 304 may include a frame to house components including first magnetic element 308, as well as one or more other elements or components as described in further detail below. In an embodiment, a magnetic field may be generated by first magnetic element 308 and can include a variable magnetic field. In embodiments, a variable magnetic field may be achieved by use of an inverter, a controller, or the like. In an embodiment, stator 304 may have an inner and outer cylindrical surface; a plurality of magnetic poles may extend outward from the outer cylindrical surface of the stator. In an embodiment, stator 304 may include an annular stator, wherein the stator is ring-shaped. In an embodiment, stator 304 is incorporated into a DC motor where stator 304 is fixed and functions to supply the magnetic fields where a corresponding rotor, as described in further detail below, rotates. In an embodiment, stator 304 may be incorporated an AC motor where stator 304 is fixed and functions to supply the magnetic fields by radio frequency electric currents through an electromagnet to a corresponding rotor, as described in further detail below, rotates.

Still referring to FIG. 3, motor 300 may include propulsor 312. In embodiments, propulsor 312 may include an integrated rotor. As used herein, a rotor is a portion of an electric motor that rotates with respect to a stator of the electric motor, such as stator 304. A propulsor, as used herein, is a component or device used to propel a craft by exerting force on a fluid medium, which may include a gaseous medium such as air or a liquid medium such as water. Propulsor 312 may be any device or component that consumes electrical power on demand to propel an aircraft or other vehicle while on ground and/or in flight. Propulsor 312 may include one or more propulsive devices. In an embodiment, propulsor 312 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 312 may include at least a blade. Persons skilled in the art, upon reviewing the entirety of this disclosure, will be aware of various devices that may be used as propulsor 312. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 312. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 3, in an embodiment, propulsor 312 may include hub 316 rotatably mounted to stator 304. Rotatably mounted, as described herein, is functionally secured in a manner to allow rotation. Hub 316 is a structure which allows for the mechanically coupling of components of the integrated rotor assembly. In an embodiment, hub 316 can be mechanically coupled to propellers or blades. In an embodiment, hub 316 may be cylindrical in shape such that it may be mechanically joined to other components of the rotor assembly. Hub 316 may be constructed of any suitable material or combination of materials, including without limitation metal such as aluminum, titanium, steel, or the like, polymer materials or composites, fiberglass, carbon fiber, wood, or any other suitable material. Hub 316 may move in a rotational manner driven by interaction between stator and components in the rotor assembly. Persons skilled in the art, upon reviewing the entirety of this disclosure, will be aware of various structures that may be used as or included as hub 316, as used and described herein.

Still referring to FIG. 3, in an embodiment, propulsor 312 and/or rotor shaft 336 may include second magnetic element 320, which may include one or more further magnetic elements. Second magnetic element 320 generates a magnetic field designed to interact with first magnetic element 308. Second magnetic element 320 may be designed with a material such that the magnetic poles of at least a second magnetic element are oriented in an opposite direction from first magnetic element 308. In an embodiment, second magnetic element 320 may be affixed to hub 316, rotor shaft 336, or another rotating or stationary electric motor component disclosed herein. Affixed, as described herein, is the attachment, fastening, connection, and the like, of one component to another component. For example, and without limitation, affixed may include bonding the second magnetic element 320 to hub 316, such as through hardware assembly, spot welding, riveting, brazing, soldering, glue, and the like. Second magnetic element 320 may include any magnetic element suitable for use as first magnetic element 308. For instance, and without limitation, second magnetic element may include a permanent magnet and/or an electromagnet. Second magnetic element 320 may include magnetic poles oriented in a second direction opposite, in whole or in part, of the orientation of the poles of first magnetic element 308. In an embodiment, motor 300 may include a motor assembly incorporating stator 304 with a first magnet element and second magnetic element 320. First magnetic element 308 may include magnetic poles oriented in a first direction, a second magnetic element includes a plurality of magnetic poles oriented in the opposite direction than the plurality of magnetic poles in the first magnetic element 308.

Referring again to FIG. 3, in an embodiment, first magnetic element 308 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 308. In an embodiment, first magnetic element 308 may produce a magnetic field according to magnetic poles of first magnetic element 308 oriented in a first direction. Second magnetic element 320 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 316 and rotor assembly may both be cylindrical in shape where rotor may have a slightly smaller circumference than hub 316 to allow the joining of both structures. Coupling of hub 316 to stator 304 may be accomplished via a surface modification of either hub 316, stator 304 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 312 into hub 316, may reduce a profile of motor 300 resulting in a reduced profile drag. In an embodiment, the rotor, which may include motor inner magnet carrier 324, motor outer magnet carrier 328, propulsor 312 may be incorporated into hub 316. In an embodiment, inner motor magnet carrier 324 may rotate in response to a magnetic field. The rotation may cause hub 316 to rotate. This unit may be inserted into motor 300 as one unit. This may enable ease of installation, maintenance, and removal.

Still referring to FIG. 3, stator 304 may include through-hole 332. Through-hole 332 may provide an opening for a component to be inserted through to aid in attaching propulsor with integrated rotor and rotor shaft to stator. In an embodiment, through-hole 332 may have a round or cylindrical shape and be located at a rotational axis of stator 304, which in an embodiment may be similar to or the same as axis of rotation 312. Hub 316 may be mounted to stator 304 by means of rotor shaft 336 rotatably inserted though through-hole 332. The rotor shaft 336 may be mechanically coupled to stator 304 such that rotor shaft 336 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 332 may have a diameter that is slightly larger than a diameter of rotor shaft 336 to allow rotor shaft 336 to fit through through-hole 332 to connect stator 304 to hub 316. Rotor shaft 336 may rotate in response to rotation of propulsor 312.

Still referring to FIG. 3, motor 300 may include a bearing cartridge 340. Bearing cartridge 340 may include a bore. Rotor shaft 336 may be inserted through the bore of bearing cartridge 340. Bearing cartridge 340 may be attached to a structural element of a vehicle. Bearing cartridge 340 functions to support the rotor and to transfer the loads from the motor. Loads may include, without limitation, weight, power, magnetic pull, pitch errors, out of balance situations, and the like. Bearing cartridge 340 may include a bore. Bearing cartridge 340 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 340 may be subject to a load which may include, without limitation, a radial or a thrust load. Depending on the location of bearing cartridge 340 in the assembly, it may see all of a radial or thrust load or a combination of both. In an embodiment, bearing cartridge 340 may join motor 300 to a structure feature. Bearing cartridge 340 may function to minimize the structural impact from the transfer of bearing loads during flight and/or to increase energy efficiency and power of propulsor. Bearing cartridge 340 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 340 may act to keep propulsor 312 and components intact during flight by allowing motor 300 to rotate freely while resisting loads such as an axial force. In an embodiment, bearing cartridge 340 may include a roller bearing incorporated into the bore. a roller bearing is in contact with rotor shaft 336. Stator 304 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 336 into bearing cartridge 340.

Still referring to FIG. 3, motor 300 may include a motor assembly incorporating a rotating assembly and a stationary assembly. Hub 316, motor inner magnet carrier 324 and rotor shaft 336 may be incorporated into the rotor assembly of motor 300 which make up rotating parts of electric motor, moving between the stator poles and transmitting the motor power. As one integrated part, the rotor assembly may be inserted and removed in one piece. Stator 304 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 308 in motor 300 may include an active magnet. For instance, and without limitation, a second magnetic element may include a passive magnet, a magnet that reacts to a magnetic force generated by first magnetic element 308. In an embodiment, a first magnet positioned around the rotor assembly, may generate magnetic fields to affect the position of the rotor relative to the stator 304. A controller may have an ability to adjust electricity originating from a power supply and, thereby, the magnetic forces generated, to ensure stable rotation of the rotor, independent of the forces induced by the machinery process.

Motor 300 may include impeller 344, which may be used as impeller 220, coupled with the rotor shaft 336. An impeller, as described herein, is a rotor used to increase or decrease the pressure and flow of a fluid, including at least air. Impeller 344 may function to provide cooling to motor 300. Impeller 344 may include varying blade configurations, such as radial blades, non-radial blades, semi-circular blades and airfoil blades. Impeller 344 may further include single and/or double-sided configurations. Impeller 344 is described in further detail below. Additionally, or alternatively, in a non-limiting illustrative example, rotor shaft 336 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 4:
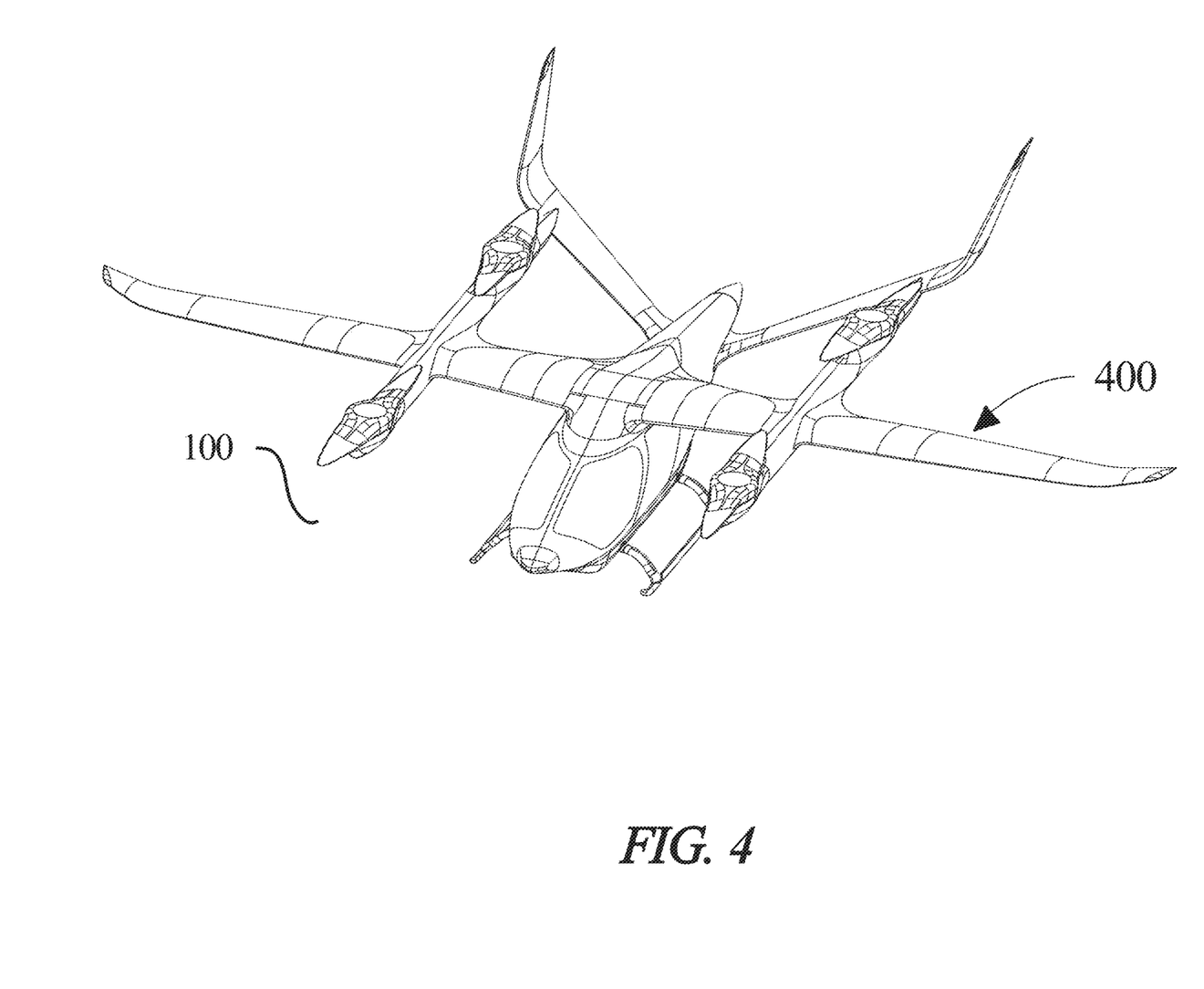
FIG. 4 is an embodiment of an integrated motor incorporated in an electric aircraft.

Now referring to FIG. 4, an exemplary electric aircraft to include motor 100 is illustrated. Electric aircraft 400 may include motor 800 may be mounted on a structural feature of an aircraft. Design of motor 800 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 400. For example, and without limitation structural feature may be any portion of a vehicle incorporating motor 800, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior;

aluminum parts or other elements may be enclosed for structural strength, or for purposes of supporting, for instance, vibration, torque or shear stresses imposed by at least propulsor 812. Persons skilled in the art, upon reviewing the entirety of this disclosure, will be aware of various materials, combinations of materials, and/or constructions techniques.

Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor 812 of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, motor 800 may eliminate need for many external structural features that otherwise might be needed to join one component to another component. Motor 800 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Still referring to FIG. 4, electric aircraft 400 can include motor 800. Motor 800 may include a stator which has a first magnetic generating element generating a first magnetic field. Motor 800 may also include propulsor 812 with an integrated rotor assembly of the motor assembly which may include includes a hub mounted to stator, at least a second magnetic element generating a second magnetic field. First magnetic field and second magnetic field vary with respect to time which generates a magnetic force between both causing the rotor assembly to rotate with respect to the stator.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A motor for an electric vertical takeoff and landing aircraft, the motor comprising:
   a stator centered on an axis of rotation of the motor, the stator having an inner cylindrical surface and an outer cylindrical surface that is spaced radially outward from the inner cylindrical surface relative to the axis of rotation;
   a rotor that includes a rotor cylindrical surface, the rotor centered on the axis of rotation and disposed within the stator such that an air gap is formed between the rotor cylindrical surface and the inner cylindrical surface;
   a plurality of magnets positioned on the rotor cylindrical surface and spaced from the inner cylindrical surface of the stator by the air gap; and
   a fan configured to rotate with the rotor, the fan including:
      a base platform located at an axial end of the rotor, the base platform having a surface that extends inward from a perimeter of the rotor at an angle relative to the axis of rotation; and
      a plurality of blades that protrude from the surface, the plurality of blades configured to direct air toward the air gap.

2. The motor of claim 1, wherein the fan is configured as a centrifugal fan.

3. The motor of claim 1, wherein the plurality of blades are located along the perimeter of the rotor.

4. The motor of claim 1, wherein the rotor further includes a rotor shaft centered on the axis of rotation, and wherein the plurality of blades have inner edges that are spaced radially outward from the rotor shaft.

5. The motor of claim 1, wherein the fan is a first fan, wherein the rotor further includes a rotor shaft centered on the axis of rotation, and wherein the motor further comprises:
- a propulsor connected to the rotor shaft; and
- a second fan connected to the rotor shaft, wherein the second fan is spaced from the first fan along the axis of rotation.

6. The motor of claim 5, wherein the second fan includes a second plurality of blades.

7. The motor of claim 1, wherein the surface extends perpendicular to the axis of rotation.

8. The motor of claim 1, wherein each blade of the plurality of blades is oriented radially relative to the axis of rotation.

9. The motor of claim 8, wherein each blade of the plurality of blades is oriented perpendicular to the surface.

10. The motor of claim 1, wherein the base platform is annular.

11. A device for cooling a motor of an electric vertical takeoff and landing aircraft, the device comprising:
- a rotor configured to rotate around an axis of rotation, the rotor comprising:
  - a first axial end;
  - a second axial end spaced from the first axial end along the axis of rotation; and
  - a rotor cylindrical surface that is located along a perimeter of the rotor between the first axial end and the second axial end;
- a plurality of magnets positioned on the rotor cylindrical surface opposite an inner cylindrical surface of a stator of the motor and spaced from the inner cylindrical surface by an air gap; and
- a fan connected to the first axial end and configured to rotate with the rotor around the axis of rotation, the fan comprising:
  - a base platform located at the first axial end, the base platform extending radially inward from the perimeter of the rotor; and
  - a plurality of blades supported by the base platform, the plurality of blades configured to direct air radially away from the axis of rotation.

12. The device of claim 11, wherein the base platform has a surface that extends at an angle relative to the axis of rotation and the plurality of blades protrude from the surface.

13. The device of claim 12, wherein the surface extends substantially perpendicular to the axis of rotation.

14. The device of claim 13, wherein each blade of the plurality of blades is oriented substantially perpendicular to the surface.

15. The device of claim 11, wherein each blade of the plurality of blades is oriented radially relative to the axis of rotation.

16. The device of claim 11, wherein the base platform is annular.

17. The device of claim 11, wherein the plurality of blades have inner edges that are spaced radially outward from a center of the rotor.

18. The device of claim 17, wherein the plurality of magnets comprises an annular array.

19. The device of claim 18, wherein the plurality of blades have outer edges that are spaced radially inward from the plurality of magnets.

20. The device of claim 11, wherein the plurality of blades are located along the perimeter of the rotor.

* * * * *